US006341621B1

(12) United States Patent
Tupper et al.

(10) Patent No.: US 6,341,621 B1
(45) Date of Patent: Jan. 29, 2002

(54) VALVE STRUCTURE FOR A FLUID OPERATED DEVICE

(75) Inventors: Myron D. Tupper, Boring; Bill Gallentine, Hood River, both of OR (US)

(73) Assignee: Latch-Tool Development Co. LLC, Colorado Springs, CO (US)

(*) Notice: Subject to any disclaimer, the term of this patent is extended or adjusted under 35 U.S.C. 154(b) by 0 days.

(21) Appl. No.: 09/472,241

(22) Filed: Dec. 27, 1999

Related U.S. Application Data

(63) Continuation-in-part of application No. 09/246,847, filed on Feb. 9, 1999, now Pat. No. 6,035,634.

(51) Int. Cl.[7] .......................... F16K 31/12; F04B 53/12; F16D 31/02

(52) U.S. Cl. ........................ 137/493; 137/467; 137/529; 91/355

(58) Field of Search ................................. 137/467, 493, 137/493.9, 529, 535, 860; 91/355; 92/255; 60/477; 417/549, 553

(56) References Cited

U.S. PATENT DOCUMENTS 1,717,271 A 6/1929 Simmons
1,894,358 A 1/1933 Mortimer
2,704,087 A 3/1955 Lindsay
2,734,723 A 2/1956 Larcen
2,951,467 A 9/1960 Morrison
2,969,771 A 1/1961 Caudill
3,092,137 A * 6/1963 Thieme et al. .............. 137/493
3,108,610 A * 10/1963 De See ....................... 137/493
3,169,455 A 2/1965 Hoffmann
3,199,636 A * 8/1965 De Carbon ................. 137/493
3,251,376 A * 5/1966 Worden ...................... 137/493
3,320,861 A 5/1967 Johnson et al.
3,587,755 A 6/1971 Slusher
4,010,609 A 3/1977 Boutroy et al.
4,031,619 A 6/1977 Gregory
4,206,603 A 6/1980 Mekler
4,246,973 A 1/1981 Mayer
4,263,801 A 4/1981 Gregory
4,356,871 A 11/1982 Fujikawa
4,460,051 A 7/1984 Widmer
4,514,796 A 4/1985 Saulters et al.

(List continued on next page.)

FOREIGN PATENT DOCUMENTS

GB 655522 7/1951

*Primary Examiner*—Michael Powell Buiz
*Assistant Examiner*—Ramesh Krishnamurthy
(74) *Attorney, Agent, or Firm*—Manelli Denison & Selter; Edward J. Stemberger

(57) ABSTRACT

A bi-stable valve arrangement includes a body having first and second opposing ends and constructed and arranged to define a passage between the body and another element so that the passage extends from the first end to the second end. A seal member associated with the body. A first spring structure biases the seal member in a first direction and a second spring structure biases the seal member in a direction opposite the first direction. The first and second spring structures are constructed and arranged so that the seal member may seal the passage. The first and second spring structures have spring loads such that under certain fluid pressure conditions on the first and second sides of the body, the seal member moves against the bias thereon to permit fluid flow through the passage in one direction, and under different pressure conditions on the first and second sides of the body, the seal member moves against the bias thereon to permit fluid to flow through the passage in a direction opposite the one direction. A check valve and an over pressure valve structure are also provided.

18 Claims, 7 Drawing Sheets

U.S. PATENT DOCUMENTS 4,689,957 A 9/1987 Gallentine
4,722,507 A 2/1988 Lindackers et al.
4,899,836 A 2/1990 Venot
4,947,672 A 8/1990 Pecora et al.
4,947,941 A 8/1990 Sudnishnikov et al.
4,957,021 A 9/1990 Helton
5,065,664 A 11/1991 Ohta et al.
5,361,680 A 11/1994 Matsui
5,374,418 A 12/1994 Oshino et al.
5,477,932 A 12/1995 Asakura et al.

* cited by examiner

VALVE STRUCTURE FOR A FLUID OPERATED DEVICE

This is a continuation-in-part of U.S. patent application Ser. No. 09/246,847, filed Feb. 9, 1999 (now U.S. Pat. No. 6,035,634) and claims the benefit thereof.

BACKGROUND OF THE INVENTION

1. Field of the Invention

The present invention relates to manually actuated, hydraulically operated tools of the type having working elements such as jaws or cutters which close over a work-piece and valving thereof. More particularly, the invention relates to a hand tool having a hydraulic circuit contained entirely within a housing containing two pistons. One piston converts manual input force to fluid pressure. The other piston converts fluid pressure to output force for imposing on the work. The tool enables three speeds of closure of jaw or corresponding tool movement at one input speed.

The field of endeavor most likely to benefit from this invention is the construction industry in that the device is specifically intended for use in creating effective hand tools which are often used in the building trades. However, the general fields of mechanical assembly and automotive repair could also benefit from the apparatus herein disclosed. For example, any process requiring crimping, bending, punching, cutting, pressing, etc. could significantly benefit from the performance characteristics of the instant hydraulic tool.

It can be appreciated that the potential field of use for this invention are myriad and the particular preferred embodiment described herein is in no way meant to limit the use of the invention to the particular field chosen for exposition of the details of the invention.

2. Description of Related Art

Gripping, clamping, pressing, and punching tools frequently employ hydraulic circuits for actuating solid moving parts of the tool. Hydraulics are quite practical to magnify manual force which can be applied to a work piece. Magnification of force is readily accomplished by varying respective areas of driving and driven components, such as a pump plunger and a driven piston, subjected to fluid pressure. Overpressure relief valves and manual release valves are also easily incorporated into hydraulic circuitry. However, the incorporation of such valving features has previously added considerable expense and complexity to the mechanism. This expense has been a major reason that small hydraulic hand tools have not achieved widespread success in the marketplace.

Thus, there is a need to provide hydraulic tool having valve structure of reduced complexity and cost.

SUMMARY OF THE INVENTION

An object of the present invention is to fulfill the needs referred to above. In accordance with the principles of the present invention, this objective is obtained by providing a bi-stable valve arrangement which includes a body having first and second opposing ends and constructed and arranged to define a passage between the body and another element so that the passage extends from the first end to the second end. A seal member is associated with the body. A first spring structure biases the seal member in a first direction and a second spring structure biases the seal member in a direction opposite the first direction. The first and second spring structures are constructed and arranged so that the seal member may seal the passage. The first and second spring structures have spring loads such that under certain fluid pressure conditions on the first and second ends of the body, the seal member moves against the bias thereon to permit fluid flow through the passage in one direction, and under different pressure conditions on the first and second ends of the body, the seal member moves against the bias thereon to permit fluid to flow through the passage in a direction opposite the one direction.

In accordance with another aspect of the invention a check valve includes a body having a passage therein in open communication with a source of fluid. A spring support structure is coupled to and extends from the body. A seal structure includes an elastomer seal member disposed generally adjacent to the passage. A spring is supported by the spring support structure and biases the seal structure so that the seal member is in a sealing position preventing fluid from the source from exiting the passage. A load of the spring is such that when fluid pressure in the passage exceeds the spring load, the seal structure moves against the bias of the spring, permitting the seal member to move to an unsealing position to permit fluid to exit the passage.

In accordance with yet another aspect of the invention, a pressure releasing valve arrangement includes a valve structure having a valve member constructed and arranged to be disposed in a housing chamber of an element to seal an opening in the element. The opening communicates a fluid pressure chamber of the element with the housing chamber. The valve member separates the fluid pressure chamber from the housing chamber. The valve structure is constructed and arranged to be operatively associated with a movable member mounted for movement within the element. A spring biases the valve member towards a sealing position to seal the opening. When fluid pressure in the fluid pressure chamber reaches a pre-determined pressure, the valve member moves from the sealing position against the bias of the spring to unseal the opening permitting fluid pressure in the fluid pressure chamber to be reduced below the pre-determined pressure, due to fluid entering the housing chamber. Further, when the movable member moves to an over-travel condition, the valve structure is engaged by the movable member and moved therewith which causes the valve member to move from the sealing position to unseal the opening.

Other objects, features and characteristic of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

Various other objects, features, and advantages of the present invention will become more fully appreciated as the same becomes better understood when considered in conjunction with the accompanying drawings, wherein like parts are given like numerals.

DETAILED DESCRIPTION OF THE PREFERRED EMBODIMENTS

Figure 1:
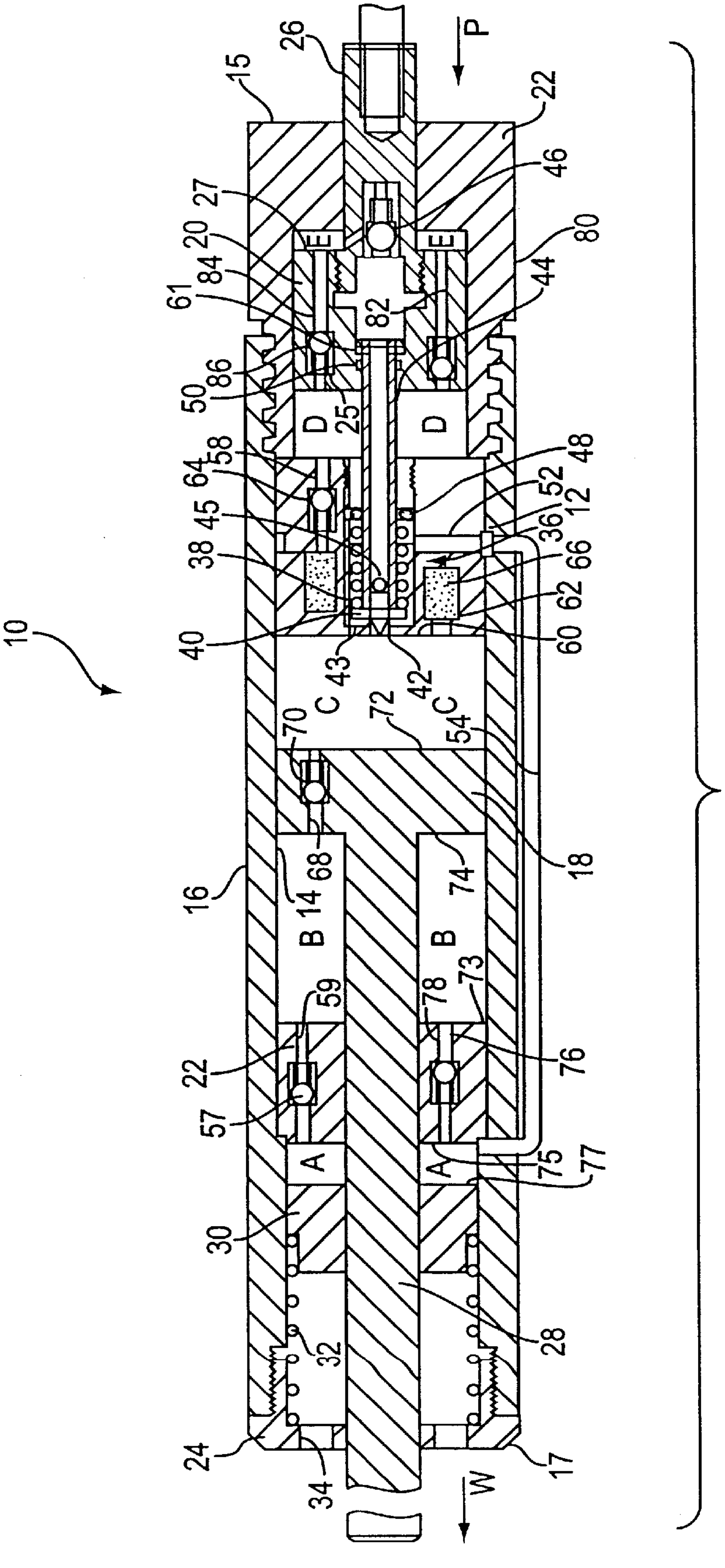
FIG. 1 is a diagrammatic, side cross-sectional view of a hydraulic device provided in accordance with the principles of a first embodiment of the present invention.

With reference to FIG. 1, a three-speed hydraulic device preferably in the form of a tool is shown, generally indicated at 10, provided in accordance with the principles of the present invention. The hydraulic tool 10 includes a cylindrical bulkhead 12 disposed within an interior bore 14 of a unitary cylindrical housing structure 16. Interior bore 14 encloses a ram piston 18 driven by pressurized fluid and a pump piston 20 for developing this pressure. At a first end 15 and a second end 17 of the housing 16, a removable housing end cap 22 and 24, respectively, is provided. The end caps are shown as being threaded into the housing 16 but other forms of attachment, such as bolts or the like, could be used. In the broadest aspect of the invention, the end caps 22 and 24 may be considered to be part of the housing 16. The cylindrical housing, piston, and ram could be of square, hexagonal or other cross-section if desired. Furthermore, the housing structure 16 may be composed of separate housings, such as, a pump housing and a ram housing.

In the illustrated embodiment, interior bore 14 is subdivided into a pumping chamber D, a driving chamber C, a pump reservoir chamber E, a ram reservoir chamber B and an accumulator chamber A. The chambers A, B and E receive and dispense fluid displaced during operation of the tool 10. The pumping chamber is defined by a first end surface 25 of the pump piston 20 and surfaces of the bulkhead 12 and of the housing 16. Pump reservoir chamber E is defined by the surfaces of the first end 15 of the housing 16 and a second end surface 27 of the pump piston 20. The drive chamber C is defined by surfaces of the bulkhead 12 and of the housing 16 and a first or rear surface 72 of the ram piston 18. Ram reservoir chamber B is defined by surfaces of the housing 16, of surface 73 of the barrier 22, and of a second or front surface 74 of the ram piston 18. Finally, accumulator chamber A is defined by surfaces of the housing 16, of surface 75 of the barrier 22, and of surface 77 of an accumulator piston 30 which is located at the second end of the housing 16.

The total volume of all the chambers is slightly variable due to fluid displaced by the pump piston rod 26 and the ram piston rod 28 during movement of the pump piston 20 and ram piston 18. This rod displacement volume variation is accommodated by a spring loaded accumulator piston 30, which forms a movable end wall sealing chamber A at the left side thereof, as depicted in FIG. 1. Accumulator piston 30 has an opening closely cooperating with ram piston rod 28. A spring 32 urges the accumulator piston 30 to the right as show in FIG. 1. Spring 32 is suitably entrapped within housing 16 so that it acts continuously against piston 30. In the broadest aspect of the invention, the accumulator piston 30 may be considered part of the second end of the housing 16. The area within housing 16 enclosing spring 32 is open to the atmosphere via ports 34 to avoid fluid pressures below atmospheric pressure, which would tend to interfere with operation of the tool 10.

The bulkhead 12 includes a ram piston return and overpressure valve structure, generally indicated at 36 in FIG. 1. The valve structure 36 is preferably a spring loaded valve having a spring 38 which acts on valve member 40 to seal opening 42 in the bulkhead 12. Opening 42 communicates with drive chamber C and with chamber 43 which houses the valve structure 36. A conduit 44 is operatively coupled with the valve member 40 at one end thereof. The other end of the conduit 44 is operatively associated with the pump piston 20 and communicates with pump reservoir chamber E through check valve 46. Conduit 44 communicates with bulkhead chamber 43 via passage 45. O-rings 48 and 50 are provided about the conduit 44 to permit the normal pump stroke without moving the conduit 44 or the valve structure 36. A conduit 52 is in communication with chamber 43 and communicates with an external conduit 54. Conduit 54 is in communication with accumulator chamber A and together with conduit 52, chamber 43, conduit 44 define communication structure fluidly communicating the accumulator chamber A with the pump reservoir chamber E. Check valve 46 may be considered to be part of the communication structure.

Although the conduit 54 is shown to be external to the housing 16, it can be appreciated that the conduit 54 may be a channel defined in the wall of housing 16. In addition, it can be appreciated that configuration of the communication structure is not limited to that described above, but includes any structure which permits fluid communication from the accumulator chamber A to pump reservoir chamber E.

A first mode of operation of the tool 10 is a high-speed, low force mode in which jaws (not shown) or other working elements associated with the hydraulic tool 10 are moved into engagement with a workpiece. There is little need for force beyond moving the working elements to the point of contact with the work piece. Hence, force is exchanged for increase speed of closure of the jaws during positioning of the tool on the workpiece.

With reference to FIG. 1, the high-speed mode for closing of a the working elements will now be described. Force is applied via input shaft 26 of pump piston 20 in the direction of arrow P. This may be accomplished, for example, by actuating a hand operated trigger (not shown in FIG.1). Fluid contained in pumping chamber D is pressurized and flows through connecting structure to enter drive chamber C thereby urging ram piston 18 toward the left in FIG. 1. In the illustrated embodiment, the connecting structure comprises conduits 58 and 60, and an annular channel 62 so as to fluidly communicate chambers C and D. A unidirectional valve in the form of a check valve 64 in conduit 58 of the bulkhead 12 opposes back flow from chamber C to chamber D. A filter 66 is provided in channel 62 to filter out any foreign material in the fluid so as to not disrupt operation of any of the valves in the tool 10.

When no resistance is imposed upon ram rod 28, fluid is ejected from ram reservoir chamber B through conduit 68 past a unidirectional high-speed control valve structure, preferably a check valve 70 and into drive chamber C. This is possible since the net effective area of rear surface 72 of piston ram piston 18 exceeds that of front surface 74 due to the presence of ram rod 28 reducing effective area of front surface 74. Thus, pressure in chamber B is incrementally greater than that in chamber C which expresses fluid from chamber B to chamber C until the pressures are equal in chambers B and C causing the ram rod 28 to move rapidly in the direction of arrow W. Equilibrium is accomplished when the opposing force of friction or resistance from engaging the work equals the pressure in chamber C divided by the cross-sectional area of the ram rod 28. This action increases speed of pump piston 20 relative to that which would result if pumping chamber D were the only source of fluid entering drive chamber C. In addition, the accumulator chamber A communicates with pump reservoir chamber E as explained above which further causes the pump piston 20 to move in the direction of arrow P. The increased speed of pump piston 20 gives rise to the aforementioned high speed mode.

When ram rod 28 encounters a predetermined degree of resistance which would correspond to engagement of the workpiece, the pressure in chamber B builds and overcomes spring loaded check valve 78 thereby opening conduit 76. At this time, an intermediate speed mode prevails as fluid is continuously pumped from pumping chamber D to drive chamber C through conduit 58 past check valve 64. The fluid from ram reservoir chamber B is now diverted to the accumulator chamber A, rather than back to pumping chamber D through conduit 68 and valve 70, since the back-pressure on valve 70 from chamber C now keeps valve 70 closed. Fluid from the accumulator chamber A moves through conduit 54, 36, chamber 43, conduit 44 past check valve 46 to back-fill the pump reservoir chamber E.

When still greater resistance is encountered requiring added force over that available in the intermediate mode, a low speed, high force mode prevails. When increased pressure developed in pumping chamber D opens control valve structure in the form of a spring loaded check valve 80 in conduit 82, some fluid ejected from pumping chamber D flows into pump reservoir chamber E. This action bypasses the surface area of pump piston 20 thus bringing the cross-sectional area of the pump rod 26 into play. The pressure produced from the mechanical input force, which remains constant, is therefore increased by the ratio of the pump piston surface and the cross-sectional area of the pump rod 26. As an example, assuming that the diameter of the pump rod 26 is one-third of the diameter of he pump piston, then the pressure in chamber B would be 9 times greater than that before the shift to this high force mode. In this mode, pumping chamber D communicates with drive chamber C through conduit 58, 60 and channel 62 via valve structure 64 and ram reservoir chamber B communicates with the accumulator chamber A through conduit 76 via valve structure 78. It can be appreciated that for a given force applied to piston rod 26 in the low speed, high force mode, the pressure generated in pumping chamber D increases in proportion to the decrease in the net effective area of piston 20. This increased pressure is translated to ram piston 18 which in turn delivers an increased force to the ram rod 28.

Anytime the pump piston 20 is retracted to the right (in the direction opposite that of arrow P in FIG. 1), by pulling on shaft 26, a pump piston return stroke is initiated. Just prior to this action, chamber E has been back-filled by action of the accumulator chamber A expressing fluid through conduits 54 and 36, chamber 43, conduit 44, past check valve 46. Now as the pump piston 20 is moved to the right, the pressure in pump reservoir chamber E begins to increase which closes valve 46 and cracks open check valve 86 and allowing fluid to pass into to pumping chamber D.

The valve structure 36 functions as a combined over-pressure relief and pressure release mechanism. During the normal course of operations, fluid pressure in the tool 10 continues to increase by action of the pump piston 20 which in turn imparts increased force on ram piston 28. When pressure in the drive chamber C reaches a pre-determined pressure as regulated by spring 38, valve 40 disengages from its seat, thus permitting fluid flow through opening 42. Fluid moves into bulkhead chamber 43 until the pressure in the drive chamber C returns to the pre-determined maximum pressure. Fluid entering chamber 43 is distributed to piston reservoir chamber E through conduit 44 and secondarily through conduits 52, 54 and into chamber A. This overpressure relief mechanism prevents the tool 10 from becoming too aggressive for its work and provides the user a cautionary measure of safety. Now once the tool 10 has performed its work, valve structure 36 becomes the mechanism for releasing and resetting the tool 10. Over-travel of the pump piston 20 away from the bulkhead 12 beyond its normal pumping range will cause shoulder 61 to be engaged causing it to travel to the right in FIG. 1. This action unseats valve 40 permitting fluid in drive chamber C to communicate with accumulator camber A, and through conduit 59 and valve 57, to communicate with ram reservoir chamber B, and through chamber 43 and conduit 44, to communicate with the piston reservoir chamber E, and through conduit 84 and valve 86, to communicate with pumping chamber D. While in this mode, ram 28 may be retracted into the tool 10 by hand or some other external force. Once the tool 10 has been reset, the pump piston is released form its over-traveled position and spring 38 will reseat valve 40.

When the ram piston 18 is to be retracted into the tool 10 by some external force (not shown), the pump piston 20 is pulled to its over-traveled position, thereby unseating valve member 40 and opening passage 42. Retracting the ram piston 18 forces fluid from chamber C through bulkhead chamber 43, conduits 52 and 54 into the accumulator chamber A. Fluid from the accumulator chamber A passes through conduit 59 and valve 57 in the barrier 22 to back fill chamber B. The net addition of the fluid to the accumulator chamber A is essentially the volume of the ram rod 28 now pushed back into the tool 10. At the point that the pump piston 20 is in its over-traveled position and valve member 40 is opened, all chambers are communicating with one another and pressures are equalizing. When valve member 40 is opened, fluid in the drive chamber C communicates with the pump reservoir chamber E via conduit 44 and fluid in the pump reservoir chamber E communicates with the pumping chamber D via passage passages 86. Fluid demands for chambers D and E have essentially already been supplied, accumulator chamber A now expands to take up the fluid displaced by the ram rod 28 as it is retracted into the tool 10.

In summary, the ram piston 18 moves at increased speed and reduced force relative to the pump piston 20 when fluid is routed from one side of the ram piston 18 to the other side thereof. Similarly, ram piston 18 moves at a reduced speed and with increased force relative to the pump piston 20 when fluid is routed from one side of the pump piston 20 to the other side thereof. When neither of these flow routs occur, an intermediate speed, intermediate force mode prevails.

The check valves described in FIGS. 1–6 are conventional and preferably of the spring-actuated, ball or needle valve type.

Figure 2:
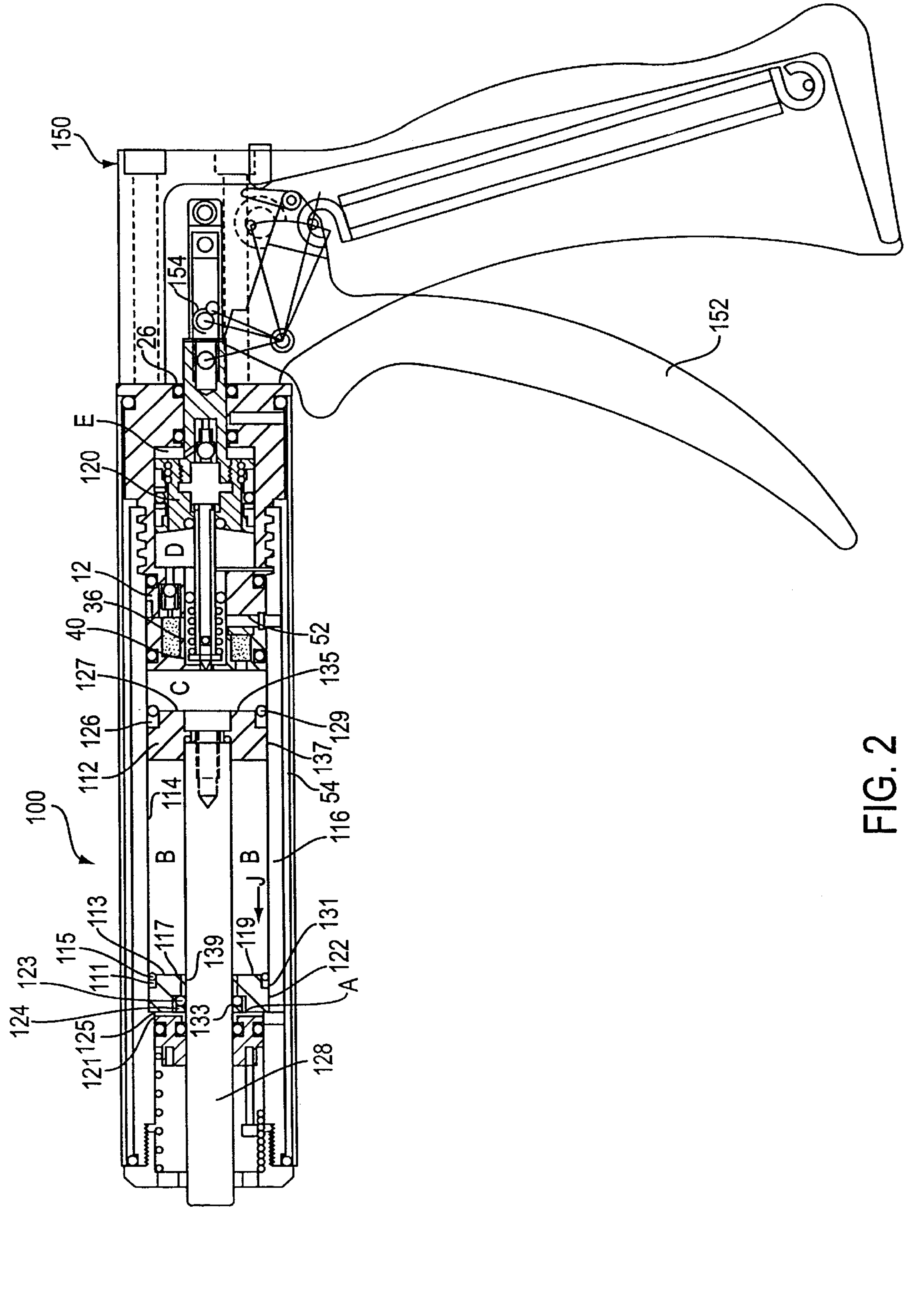
FIG. 2 is a diagrammatic, side cross-sectional view of a hydraulic tool provided in accordance with the principles of a second embodiment of the present invention.
Figure 3:
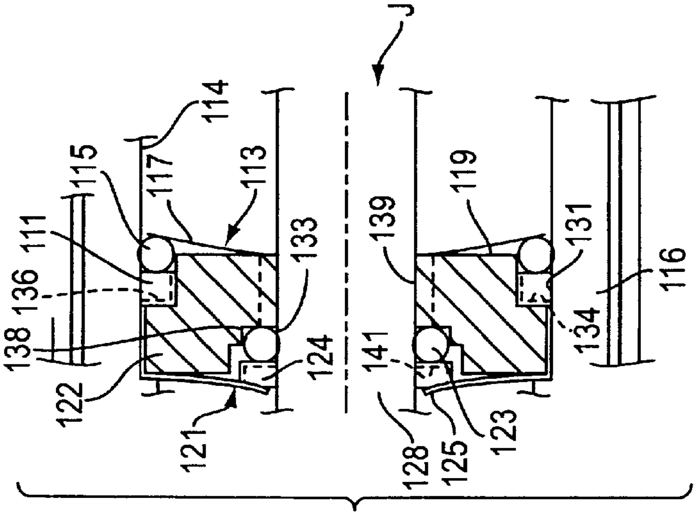
FIG. 3 is an enlarged view of a floating seal valve assembly associated with the barrier of the hydraulic tool of FIG. 2.

A second embodiment of the invention is shown in FIGS. 2 and 3. The second embodiment of the tool 100 functions the same as the first embodiment, (e.g., provides three speeds of operation). However, in the second embodiment, certain of the valve structures are in the form of floating seal valves, not check valves.

Since it is difficult to provide the proper volumetric flows in the small tool package using check valves, FIGS. 2 and 3 show a second embodiment of the invention. Thus, instead of providing conduits and check valves in the barrier 122, valve structure in the form of a floating seal valve assembly is associated with the barrier 122. As shown, the floating seal valve assembly includes a first floating seal valve, generally indicated at 113, comprising an O-ring 115 sealing a passage 131 between an outer periphery of the generally cylindrical barrier 122 and the annular wall defining inner bore 114 of the housing 116, and a spring retainer member 117 coupled to face 119 of the barrier 122 and operatively associated with the O-ring 115. In the illustrated embodiment, the floating seal valve 113 also includes a glide member 111 provided between the O-ring 115 and retainer member 117. The spring retainer member 117 slides the glide member 111 on the bore 114 and holds it against a stepped shoulder 134 defined in the barrier 122. The stepped shoulder dimensions as related to the cylinder bore 114 are typical of those required to provide a seal when the glide member 111 is in place. The axial length of the stepped shoulder and/or it's slope are such that a small hydraulic pressure can move the glide member 111 off of the shoulder 134. The glide member has a passage 136 therethrough such that when the hydraulic force deflects the spring retainer member 117, a very large fluid flow path is provided. Thus, since the glide member 111 is bearing against the shoulder 134, the glide member can support a high pressure in one direction yet permit easy flow of fluid in the opposite direction. In certain applications, the spring force on the glide member 111 may be high enough to require a predetermined pressure before the glide member 111 is moved off the stepped shoulder 134. The retainer member 117 is preferably composed of spring material such as metal and gently biases the O-ring 115 in the direction of arrow J of FIG. 2 to seal the passages 131 and 136. In the broadest aspect of the invention, the glide member 111 may be omitted.

A second, similar floating seal valve, generally indicated at 121, comprises O-ring 123, spring retainer member 125, and glide member 124 between the retainer member 125 and the O-ring 123. The O-ring bears against shoulder 138. The retainer member 125 is fixed to a surface of the barrier 122. The second floating seal valve is provided so as to selectively seal a passage 141 through the glide member 124 and passage 133 between the outer surface of the ram rod 128 and an inner wall defining bore 139 of the barrier 122. The spring load of retainer member 125 is selected such that when conditions are such that fluid may flow from ram reservoir chamber B to accumulator chamber A, the retainer 125 will flex to permit fluid to flow past the O-ring 123 and through passages 131 and 141 in the direction of arrow J. Similarly, the spring load of the retainer member 117 is such that in a ram piston retracting mode, fluid may flow past O-ring 115 through passages 141 and 133 in the direction opposite to arrow J such that fluid in the accumulator chamber A may move into ram reservoir chamber B. In the broadest aspect of the invention, the glide member 124 may be omitted.

Floating seal valve structure 127, including O-ring 129, glide member 126 and spring retainer member 135, is provided at the ram piston 112. As with floating seal valve structure 113 associated with the barrier 122, the retainer member 135 biases the O-ring 129 against a shoulder to seal a passage 137 between the periphery of the ram piston 112 and the housing inner bore 14. Thus, retainer member 135 is constructed and arranged to prevent fluid communication between the drive chamber C and ram reservoir chamber B and when required, permit large volumetric flow from ram reservoir chamber B to drive chamber C. The spring load of floating seal valve 121 is greater than that of floating seal valve 127 so as to effect the shift between the high-speed/low force and the mid-speed/mid force modes of operation. In the broadest aspect of the invention, the glide member 126 may be omitted.

Figure 4:
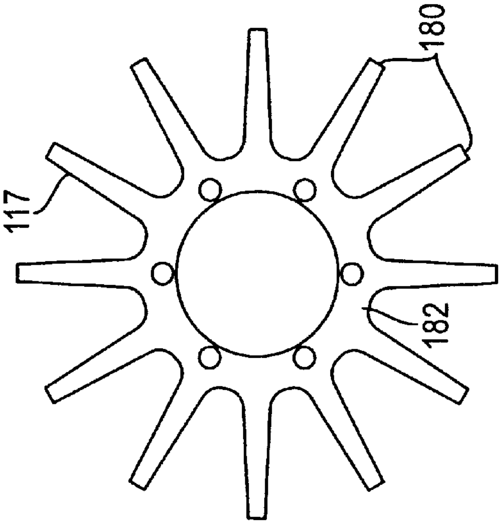
FIG. 4 is an enlarged view of a spring retainer member of the floating seal valve assembly of FIG. 3.

The spring retainer member 117 preferably has a plurality of fingers 180 extending from a central portion 182 thereof as shown in FIG. 4. Spring retainer member 135 is configured similarly.

Figure 5:
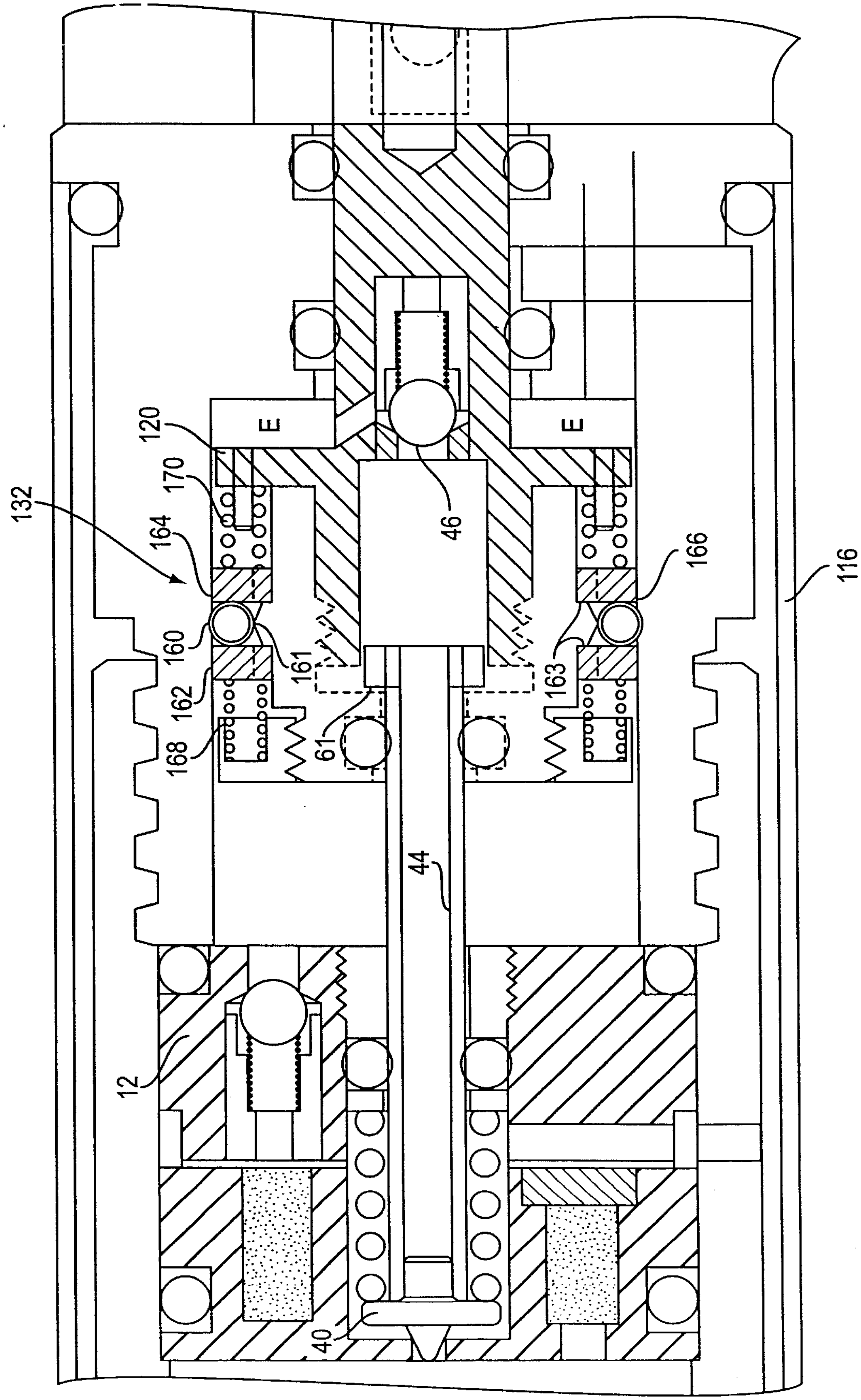
FIG. 5 is an enlarged view of the pump piston and bulkhead of the hydraulic tool of FIG. 2.

The pump piston 120 of the second embodiment has a different valve structure associated therewith than in the first embodiment of the invention. With reference to FIG. 5, an enlarged view of the generally cylindrical pump piston 120 of FIG. 2 is shown. Instead of providing conduits and check valves 80 and 86 in the pump piston as in the first embodiment of the invention, valve structure in form of a bi-stable floating seal valve arrangement, generally indicated at 132, is provided. The floating seal valve arrangement 132 comprises an O-ring 160 positioned to seat on a raised ridge 161 of the pump piston 120. Two opposing spring loaded guide rings, 162 and 164, keep the O-ring 160 on the ridge 161 and in a sealed position. Stop surfaces 163 limit the movement of the guide rings toward the O-ring 160. During operation, when the pressure in pumping chamber D reaches that planned for the transition to the high force/low speed mode, loaded spring 170 is overcome by the force of the fluid on the O-ring 160, thus moving the O-ring 160 off its seat and permitting the fluid to flow through passage 166 from the pumping chamber D to the pump reservoir chamber E. Spring 168 is normally loaded, and accommodates the passage of fluid from chamber E to chamber D during the pump refilling operation pursuant to another stroke.

The embodiment of FIG. 2 includes a handle structure, generally indicated at 150, which is operatively associated with pump rod 26 of the pump piston to actuate the same. The handle structure 150 includes a hand-operated trigger member 152 which, when actuated or squeezed, causes actuation of the tool 100 and which, when released, causes the return stroke of the ram piston 112, thus resetting the tool 100. It can be appreciated that the handle structure 150 can be provided on the tool 10 of the embodiment of FIG. 1 as well.

A mechanical linkage, generally indicated at 154, is operatively associated with the over-pressure release valve structure 36 and is used to move the valve member 40 of the valve structure 36 to an open position so that fluid may flow from the drive chamber C to the accumulator chamber A and to the pump reservoir chamber E, as noted above. The mechanical linkage is connected to the pump piston 120 with a limited slip connection so that over travel of the pump piston 120 beyond a the normal stoke moves the valve member 40 to the opened position.

Figure 6:
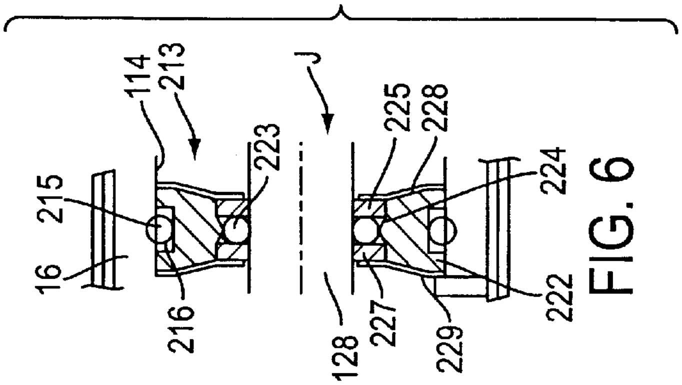
FIG. 6 is a floating seal valve provided in accordance with another embodiment of the invention.

FIG. 6 shows yet another embodiment of a bi-stable floating seal valve associated with the barrier 222. A first O-ring 215 disposed in groove 216 between bore 114 of the housing 16 and the periphery of the barrier 222 so seal a flow path between chamber A and B. The seal valve includes a second O-ring 223 positioned to seat on a raised ridge 224 of the barrier 222. Two opposing spring loaded guide rings, 225 and 227, keep the O-ring 223 on the ridge 224 and in a sealed position. The guide rings 225 have fluid flow passages therein to permit fluid flow between chambers A and B when desired. Finger springs 228 and 229 load the guide rings 225 and 227. The spring load of spring 229 is greater than that of spring 228. The spring load of spring 229 is selected such that when conditions are such that fluid may flow from ram reservoir chamber B to accumulator chamber A, the spring 229 will flex to permit fluid to flow past the O-ring 223 in the direction of arrow J and through passages in the guide rings. Similarly, the spring load of the spring 228 is such that in a ram piston retracting mode, fluid may flow past O-ring 223 through passages in the guide rings in the direction opposite to arrow J such that fluid in the accumulator chamber A may move into ram reservoir chamber B to effect the shift between the high-speed/low force and the mid-speed/mid force modes of operation.

Figure 7:
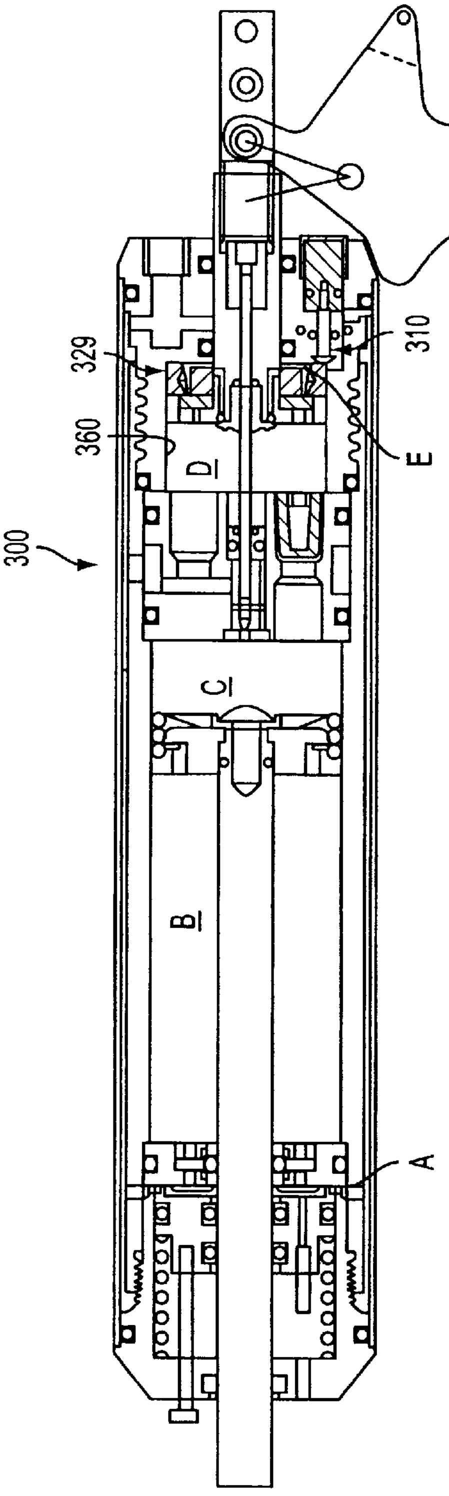
FIG. 7 is a diagrammatic, side cross-sectional view of another embodiment of a hydraulic tool provided in accordance with the principles of the present invention.
Figure 9:
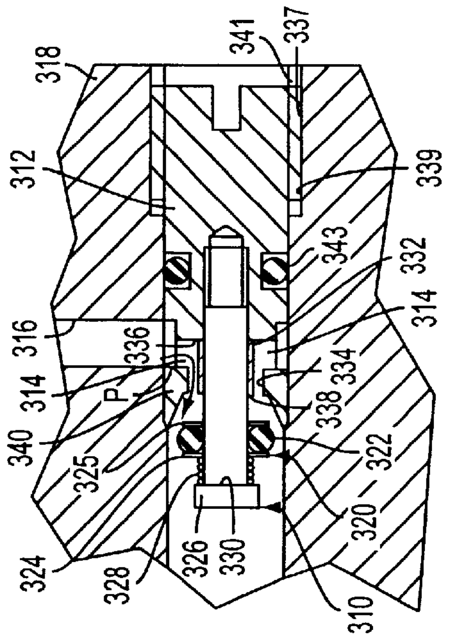
FIG. 9 is an enlarged cross-sectional view of the check valve of the tool of FIG. 7 shown in an open position.
Figure 8:
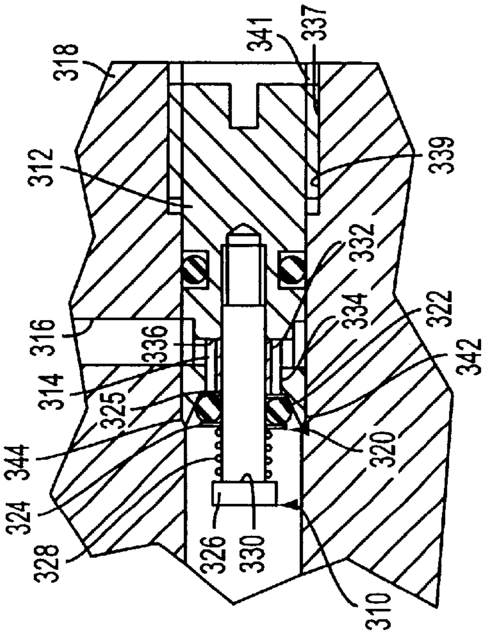
FIG. 8 is an enlarged cross-sectional view of the check valve of the tool of FIG. 7 shown in a closed position.

FIG. 7 shows another embodiment of a hydraulic tool 300 provided in accordance with the principles of the of the invention. The tool 300 operates the same as the tool 100 of FIG. 2, but certain of the valves employed in the tool 300 are different from those of the tool 100. More particularly, a novel check valve, generally indicated at 310, is provided instead of the conventional check valve 86 of FIG. 2. The check valve 310 may be employed in any system to permit fluid flow under certain conditions yet prevent fluid flow under different conditions. Thus, the tool 300 is one example of use of the check valve 310. As best shown in FIGS. 8 and 9, the check valve 310 comprises a body 312 having a passage 314 therein which is in open communication with a source of fluid (not shown) which communicates with port 316 of a housing 318. A seal structure 320, including an elastomer seal member 322, is disposed generally adjacent to the passage 314. In the illustrated embodiment, the seal structure 320 comprises an O-ring 322 sandwiched between rigid support members in the form of a first washer 324 and a second washer 325. The washers are made of rigid material such as metal or hard plastic. A spring support structure 326 is coupled to and extends from the body 312. A spring 328 is supported by the spring support structure 326 and biases the seal structure 320 so that the seal member 322 is in a sealing position preventing fluid from the source from exiting the passage 314. A load of the spring 328 is such that when fluid pressure in the passage 314 exceeds the spring load, the seal structure 320 moves against the bias of the spring 328 moving the seal member 322 to an unsealing position to permit fluid to exit the passage 314 in the direction of arrow P in FIG. 9. Thus, when the check valve 310 is open, fluid can fill chamber E behind pump piston 329 (FIG. 7). In the illustrated embodiment, the support structure 326 is a shaft threadedly engaged with the body 312 at one end thereof. The other end of the shaft has a spring seat 330 upon which one end of the spring 328 rests. The other end of the spring 328 acts on the first support member 324 to bias the seal structure 320 in the direction opposite arrow P.

The check valve 310 further includes a cylindrical spacer 332 disposed within a bore 334 in the body 312 and about the shaft 326. An outer periphery of the spacer 332 and surfaces defining the bore 334 cooperate to define at least a portion of the passage 314. One end of the spacer 332 is engaged with a surface 336 of the body 312 so as to prevent movement of the spacer 332 in a direction opposite arrow P. The other end of the spacer 332 defines a stop surface 338 (FIG. 9) which the second rigid support member 325 contacts when the sealing structure 320 is in the sealing position. The body 312 also includes a stop surface 340 which is coplanar with the stop surface 338 of the spacer 332. The second rigid support member 325 also contacts the stop surface 340 when the sealing structure 320 is in the sealing position.

The body 312 is cylindrical and includes external threads 337 which engage internal threads 339 in bore 341 of housing 318. The bore 341 includes a tapering surface 342 (FIG. 8) and the body 312 includes a surface 344 disposed in sealing engagement with the tapering surface 342 to prevent flow between the body 312 and the housing 318. Also, when surface 344 of the body 312 engages the tapering surface 342, the passage 314 is aligned with the port 316 when the body 312 is installed fully into the bore 341. As shown, port 316 is disposed transversely with respect to the bore 341. An O-ring 343 seals the body 312 in housing 318 downstream of port 316.

Although the check valve 310 has been disclosed for use in tool 300, it can be appreciated the check valve 310 may be pre-assembled and simply inserted into a bore for use in any device requiring a check valve. Furthermore, the fluid is not limited to hydraulic fluid, thus, the check valve 310 may be used with air.

Figure 10:
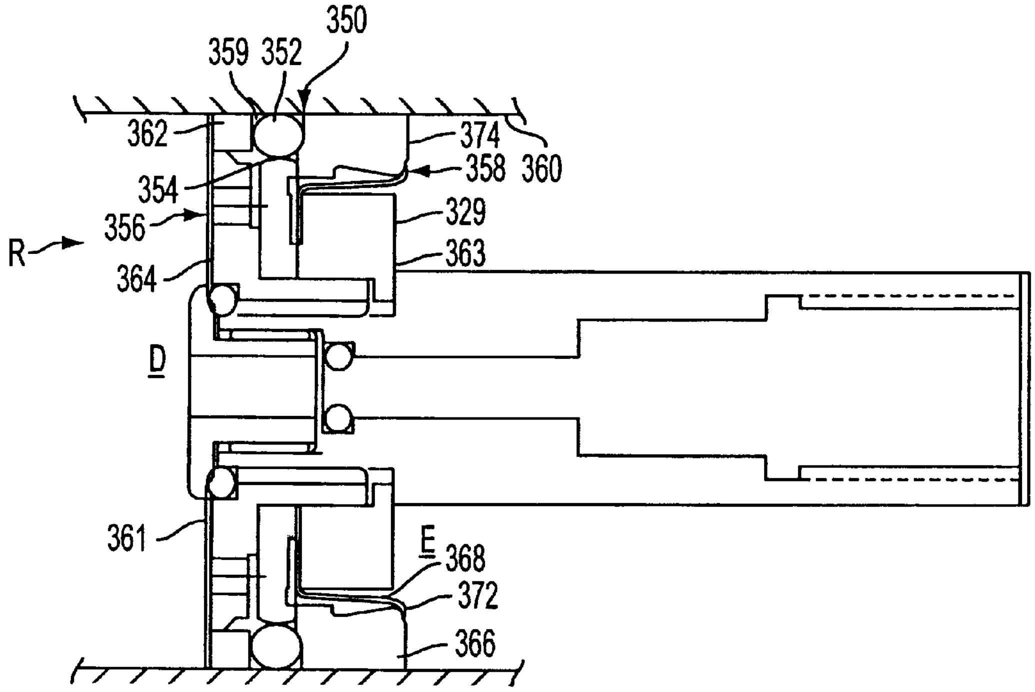
FIG. 10 is an enlarged view of a bi-stable valve structure of the tool of FIG. 7 shown in sealing position.
Figure 11:
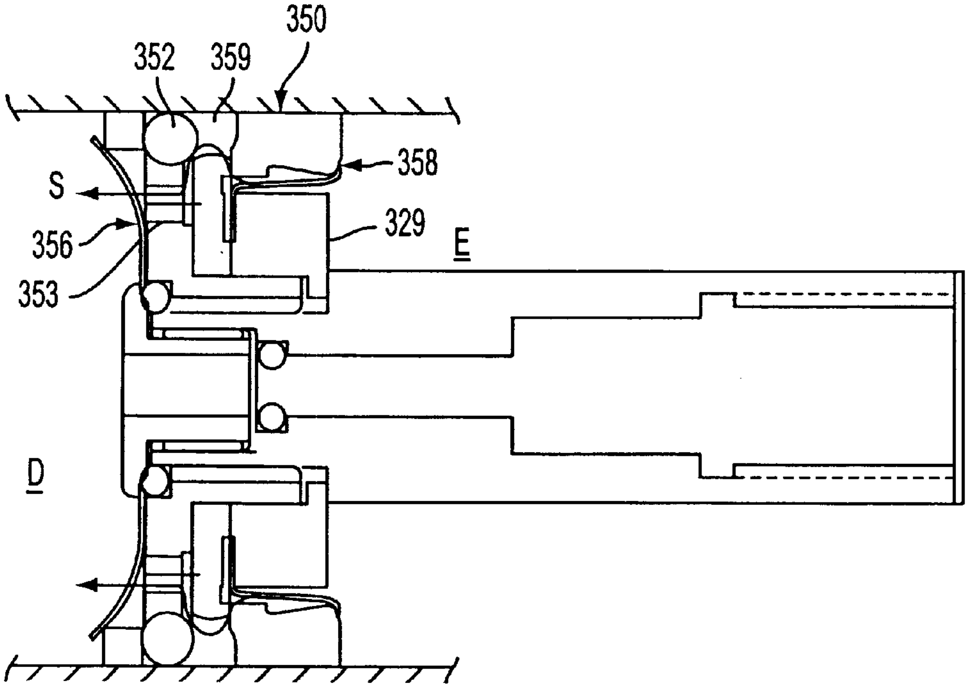
FIG. 11 is an enlarged view of a bi-stable valve structure of the tool of FIG. 7 shown in an open position allowing fluid flow in one direction.
Figure 12:
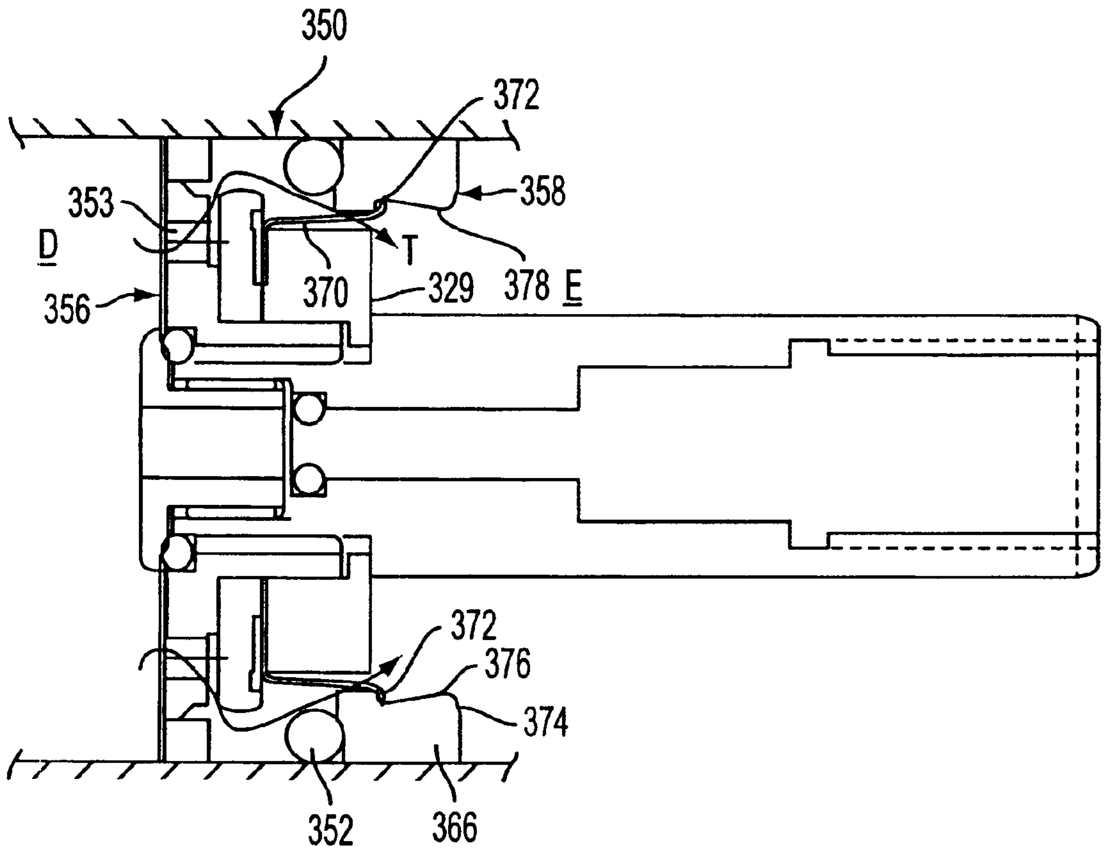
FIG. 12 is an enlarged view of a bi-stable valve structure of the tool of FIG. 7 shown in an open position allowing fluid flow in another direction.

FIGS. 10–12 are enlarged views of the pump piston 329 of FIG. 7, including a bi-sable valve structure, generally indicated at 350, of the invention. The bi-stable valve structure 350 comprises a seal member 352 positioned to seat on a raised seat 354 which is part of the pump piston 329. In the illustrated embodiment, the seal member 352 is an O-ring of circular cross-section. Two opposing first and second spring structures, generally indicated at 356 and 358, respectively, keep the seal member 352 on the seat 354 in a sealed position sealing a passage 359 defined between piston bore 360 and a periphery of the pump piston 329. The first and second spring structures have spring loads such that under certain fluid pressure conditions on a first end 361 and a second end 363 of the pump piston 329, the seal member 352 moves against the bias thereon to permit fluid flow through the passage 359 and opening 353 in pump piston 329 (in the direction of arrow S in FIG. 11). Under different pressure conditions on the first and second ends of the pump piston 329, the seal member 352 moves against the bias thereon to permit fluid to flow through opening 353 and through the passage 359 (in a direction of arrow T in FIG. 12).

The first spring structure 356 comprises a first retainer member 362 and a first spring 364 coupled to pump piston 329. The spring 364 biases the first retainer member 362 and the first retainer member 362 biases the seal member 352 in a direction of arrow R (FIG. 10). The second spring structure comprises a second retainer member 366 and a second spring 368 coupled to the pump-piston 329. The spring 368 biases the second retainer member 366 and the second retainer member 366 biases the seal member 352 in a direction opposite of arrow R (FIG. 10). The second spring 368 has a spring load greater than the spring load of the first spring 364 so that less pressure is required to move the first spring 364 than is required to move the second spring 368. As best shown in FIG. 12, the second spring 368 is a latch spring and the second retainer member 366 moves from a seal member biasing position to a latched position to maintain the passage 359 in an open condition permitting fluid flow through the passage 359. The latch spring 368 causes the second retainer member 366 to remain in the latched position until being mechanically reset to the retainer biasing position. More particularly, and as best shown in FIG. 12, the latch spring 368 has an arm member 370 having a latching portion 372 at an end thereof. The second retainer member 366 has first and second latch engaging surfaces 374, 376, respectively, disposed in spaced relation. The latching portion 372 engages the first latch engaging surface 374 when the second retainer member 366 is in the biasing position (FIG. 10) and engages the second latch engaging surface 376 when the second retainer member 366 is in the latched position (FIG. 12). The second retainer member 366 includes a cam surface 378 between the first and second latch engaging surfaces 374, 376. The latching portion 372 of the latch spring rides on the cam surface 378 as the second retainer member 366 moves from the biasing position to the latched position.

During operation of tool 300, when the pressure in pumping chamber D reaches that planned for the transition to the high force/low speed mode, loaded second spring 368 is overcome by the force of the fluid on the seal member 352, thus moving the seal member 352 off its seat (FIG. 10) and permitting the fluid to flow through passage 359 from the pumping chamber D to the pump reservoir chamber E (FIG. 12). First spring 364 is normally loaded and accommodates the passage of fluid from chamber E to chamber D during the pump refilling operation pursuant to another stroke. The second retainer member 366 is preferably mechanically reset to the biasing position by actuating the handle 382 of the tool 300 to pull-back the pump piston 329.

The O-rings described herein may be conventional, elastomeric, circular cross-section O-rings. However, other cross-sectional shapes may be used, such as, for example, rectangular, square, and U-shaped cross-sections. It can also be appreciated that other seal members, such as gaskets, may be used instead of the O-rings in the tools described herein.

The check valve 310 and bi-stable valve structure 350 of the tool 300 of FIG. 7 provide the following advantages when compared to conventional check valves and spool valves:

1) reduce or eliminate plumbing requirements, 2) are less expensive to build, and 3) provide larger volumetric through-puts and thus provide very fast response.

The foregoing preferred embodiment has been shown and described for the purposes of illustrating the structural and functional principles of the present invention, as well as illustrating the methods of employing the preferred embodiments and are subject to change without departing from such principles. Therefore, this invention includes all modifications encompassed within the spirit of the following claims.

What is claimed is:

1. A bi-stable valve arrangement comprising:

a movable body having first and second opposing ends and being constructed and arranged to define a passage between the body and another element, a seal member separate from said body, a first spring structure biasing the seal member in a first direction, and a second spring structure biasing the seal member in a direction opposite said first direction so that said seal member may seal said passage, said first and second spring structures having spring loads such that under certain fluid pressure conditions on said first and second ends of said body, said seal member moves against the bias thereon to permit fluid flow through said passage in one direction, and under different pressure conditions on said first and second ends of said body, said seal member moves against the bias thereon to permit fluid to flow through said passage in a direction opposite said one direction.

2. The valve arrangement according to claim 1, wherein said first spring structure includes a first retainer member separate from said seal member and a spring biasing said first retainer member to bias said seal member in said first direction, and said second spring structure includes a second retainer member separate from said seal member and a second spring biasing said second retainer member to bias said seal member in said direction opposite said first direction.

3. The valve arrangement according to claim 2, wherein said second spring has a spring load greater than a spring load of said first spring.

4. The valve arrangement according to claim 3, wherein said second spring is a latch spring and wherein said second retainer member moves from a retainer member biasing position to a latched position to maintain said passage in an open condition permitting fluid flow through said passage, said latch spring causing said second retainer member to remain in said latched position until being reset to said retainer member biasing position.

5. The valve arrangement according to claim 4, wherein said latch spring has an arm member having a latching portion at an end thereof, said second retainer having first and second latch engaging surfaces disposed in spaced relation, said latching portion engaging said first latch engaging surface when said second retainer member is in said biasing position and engaging said second latch engaging surface when said second retainer member is in said latched position.

6. The valve arrangement according to claim 5, wherein said second retainer member includes a cam surface between said first and second latch engaging surfaces, said latching portion of said latch spring riding on said cam surface as said second retainer member moves from said biasing position to said latched position.

7. The valve arrangement according to claim 1, in combination with a housing having a bore therein, said body being disposed in said bore so that said passage is defined between a periphery of said body and surfaces defining said bore.

8. The valve arrangement according to claim 1, in combination with a shaft extending though a bore in said body so that said passage is defined between surfaces defining said bore and a periphery of said shaft.

9. A bi-stable valve arrangement for a hydraulic device, the hydraulic device having an inner bore and an element disposed in the bore, a fluid passage being defined between the bore and a periphery of the element, and fluid pressure chambers on opposing sides of said element, said valve arrangement comprising:

a seal member disposed generally adjacent to the fluid passage, a first spring structure biasing the seal member in a first direction, and a latch spring structure biasing the seal member in a direction opposite said first direction, said first spring and said latch spring being constructed and arranged so that said seal member may seal said passage, said first spring structure and said latch spring structure having spring loads such that under certain fluid pressure conditions in said fluid pressure chambers, said seal member moves against the bias of said first spring structure to permit fluid flow through said passage in one direction, and under different pressure conditions in said fluid pressure chambers, said seal member moves against the bias of said latch spring structure to an open position permitting fluid to flow through said passage in a direction opposite said one direction, said latch spring structure ensuring that said seal member remains in said open position until a resetting condition occurs to move the seal member to again seal said passage.

10. The valve arrangement according to claim 9, wherein said first spring structure includes a first retainer member and a spring biasing said first retainer member to bias said seal member in said first direction and said latch spring structure includes a second retainer member and a latch spring biasing said second retainer member to bias said seal member in said direction opposite said first direction.

11. The valve arrangement according to claim 10, wherein said latch spring has a spring load greater than a spring load of said first spring.

12. The valve arrangement according to claim 11, wherein said second retainer member moves from a biasing position to a latched position to maintain said passage in an open condition permitting fluid flow through said passage, said latch spring causing said second retainer member to remain in said latched position until being reset to said biasing position.

13. The valve arrangement according to claim 12, wherein said latch spring has an arm member having a latching portion at an end thereof, said second retainer having first and second latch engaging surfaces disposed in spaced relation, said latching portion engaging said first latch engaging surface when said second retainer member is in said biasing position and engaging said second latch engaging surface when said second retainer member is in said latched position.

14. The valve arrangement according to claim 13, wherein said second retainer member includes a cam surface between said first and second latch engaging surfaces, said latching portion of said latch spring riding on said cam surface as said second retainer member moves from said biasing position to said latched position.

15. A bi-stable valve arrangement comprising:

a body constructed and arranged to define a passage between the body and another element, a seal member separate from said body, a first spring structure including a first retainer member, separate from said seal member, and a spring biasing said first retainer member to contact one surface of the seal member thereby biasing the seal member in a first direction, and a second spring structure including a second retainer member separate from said seal member, and a second spring biasing said second retainer member to contact a surface of the seal member opposite the one surface thereof, thereby biasing said seal member in a direction opposite said first direction so that said seal member may seal said passage, said first and second spring structures having spring loads such that under certain fluid pressure conditions, said seal member moves against the bias thereon to permit fluid flow through said passage in one direction, and under different pressure conditions, said seal member moves against the bias thereon to permit fluid to flow through said passage in a direction opposite said one direction.

16. The valve arrangement of claim 15, wherein the element is a housing having a bore, the body is a piston disposed for movement in the bore, with the passage defined between a periphery of the piston and surfaces defining said bore.

17. The valve arrangement of claim 15, wherein a shaft extends through a bore the body and the passage is defined between surfaces defining said bore and a periphery of said shaft.

18. A bi-stable valve arrangement comprising:

a body having first and second opposing ends and being constructed and arranged to define a passage between the body and another element, a seal member, a first spring structure including a first retainer member and a spring biasing said first retainer member to a sealing position, a second spring structure including a second retainer member and a second spring biasing said second retainer member to a sealing position such that when said first and second retainer members are each in their sealing positions, the seal member seals said passage, said first and second spring structures having spring loads such that under certain fluid pressure conditions on said first and second opposing ends of said body, one of said retainer members moves from its sealing position to permit fluid flow through said passage in one direction, and under different pressure conditions on said first and second opposing ends of said body, the other of said retainer members moves from its sealing position to permit fluid to flow through said passage in a direction opposite said one direction, wherein said second retainer member is movable from said sealing position to a latched position to maintain said passage in an open condition permitting fluid flow through said passage, said second spring being constructed and arranged to maintain said second retainer member in said latched position until being reset to said sealing position.

* * * * *